United States Patent
Toman et al.

(10) Patent No.: US 9,873,616 B2
(45) Date of Patent: Jan. 23, 2018

(54) METHOD AND APPARATUS FOR THE ENHANCED SEPARATION OF CALCIUM EGGSHELL FROM ORGANIC MEMBRANE

(71) Applicants: Mark Daniel Toman, Toronto (CA); Sean Matthew Kwinter, Toronto (CA)

(72) Inventors: Mark Daniel Toman, Toronto (CA); Sean Matthew Kwinter, Toronto (CA); Andrew J. Vreugdenhill, Toronto (CA)

(73) Assignee: Mark Daniel Toman, Toronto (CA)

( * ) Notice: Subject to any disclaimer, the term of this patent is extended or adjusted under 35 U.S.C. 154(b) by 166 days.

(21) Appl. No.: 14/839,245

(22) Filed: Aug. 28, 2015

(65) Prior Publication Data
US 2016/0060132 A1    Mar. 3, 2016

Related U.S. Application Data

(60) Provisional application No. 62/044,472, filed on Sep. 2, 2014.

(51) Int. Cl.
C01F 11/18 (2006.01)
C22B 7/00 (2006.01)
(Continued)

(52) U.S. Cl.
CPC ............ *C01F 11/185* (2013.01); *A23L 15/00* (2016.08); *A23L 33/16* (2016.08); *B03B 9/061* (2013.01);
(Continued)

(58) Field of Classification Search
None
See application file for complete search history.

(56) References Cited

U.S. PATENT DOCUMENTS

| 5,053,238 A | 10/1991 | Zeidler et al. |
| 6,176,376 B1 | 1/2001 | MacNeil |

(Continued)

FOREIGN PATENT DOCUMENTS

| GB | 790073 | 2/1958 |
| GB | L020447 | 2/1966 |

(Continued)

OTHER PUBLICATIONS

Evaluation of bone healing with eggshell-derived bone graft substitutes in rat calvaria: A pilot study, Article in Journal of Biomedical Materials Research Part A, Oct. 2008, 203-214.
(Continued)

*Primary Examiner* — Melissa S Swain
(74) *Attorney, Agent, or Firm* — Kramer Amado, P.C.

(57) ABSTRACT

A method and system is provided to separate calcium carbonate inorganic eggshell from the inner lining of organic protein-based membrane in eggshell by-product. The method involves three phases: mechanical agitation/separation, functional chemical digestion and refining chemical digestion. In the mechanical stage, agitation and sieving are used to remove large pieces, and the majority of, membrane material. In the functional chemical digestion stage, the by-product is processed through at least one basic solution to remove additional organic membrane and impurities. In the refining chemical digestion stage, the remaining organic membrane and impurities are removed. The purified calcium carbonate is then rinsed and dried, in preparation for further refinement and processing to finished goods specifications.

9 Claims, 3 Drawing Sheets

(51) Int. Cl.
*C22B 26/20* (2006.01)
*B03B 9/06* (2006.01)
*A23L 33/16* (2016.01)
*A23L 15/00* (2016.01)

(52) U.S. Cl.
CPC ............ *C01F 11/18* (2013.01); *C22B 7/008* (2013.01); *C22B 26/20* (2013.01); *C01P 2004/20* (2013.01); *C01P 2006/80* (2013.01); *Y02W 30/523* (2015.05)

(56) References Cited

U.S. PATENT DOCUMENTS

| | | |
|---|---|---|
| 6,649,203 B1 | 11/2003 | Thoroski |
| 7,007,806 B2 | 3/2006 | MacNeil |
| 7,597,280 B2 | 10/2009 | Floh |
| 7,954,733 B2 | 6/2011 | Vlad |
| 8,173,174 B2 | 5/2012 | Strohbehn et al. |
| 8,448,884 B2 | 5/2013 | New |
| 2006/0159816 A1 | 7/2006 | Vlad |

FOREIGN PATENT DOCUMENTS

| | | | |
|---|---|---|---|
| JP | 02221117 A | * | 9/1990 |
| WO | 2013075003 A1 | | 5/2013 |

OTHER PUBLICATIONS

International Search Report and Written Opinion for PCT /CA/ 2015/050837 dated Nov. 10, 2015.

\* cited by examiner

METHOD AND APPARATUS FOR THE ENHANCED SEPARATION OF CALCIUM EGGSHELL FROM ORGANIC MEMBRANE

REFERENCE TO RELATED APPLICATIONS

This application claims the benefit of U.S. Provisional Application No. 62/044,472, filed Sep. 2, 2014.

FIELD OF THE INVENTION

The present invention relates to a method and system of separating calcium carbonate eggshell from the inner lining of organic protein-based membrane in eggshell by-product, in an efficient manner, for the purpose of producing a high purity calcium carbonate product.

BACKGROUND

The egg processing industry discards over 600,000 tons of eggshells per year, after breaking the egg and removing the egg white and yolk. Eggshells are generally thought of as a waste product, however if the inorganic and organic components are separated, commercial materials can be obtained and utilized in a variety of applications. Large amounts of eggshell waste or by-product are generated annually and the majority ends up in landfills. Therefore the process of isolating the valuable products is of interest to keep the eggshell by-product out of landfill and to turn a low value material into a high value one.

There are two major components in eggshells: the membrane and the shell. The membrane consists mainly of organic material, including collagen and amino acids. These materials can be separated from the shell and used in the medical and cosmetic industries, among others. The inorganic component of eggshell consists of calcium carbonate with small amounts of magnesium carbonate and calcium phosphate. The majority of this portion is calcium carbonate ($CaCO_3$), which has a variety of applications. Many of these applications require the calcium carbonate product to be of a high purity, particularly where the calcium carbonate is to be used for human consumption.

There is variation across the egg processing industry of the process for discarding the shell. Some egg 'breaking' companies will dump and discard the remaining shell by-product immediately after the removal of the liquid egg. This eggshell by-product will still have remnants of wet material. Other breaking companies will first run the by-product through a centrifuge-type apparatus, for the purpose of removing the bulk of the remaining liquid egg, which will aid in reducing cost to discard the by-product.

Approaches to separating shells from membranes known in the prior art have limitations when considering the purity of the final calcium carbonate product, cost effectiveness of the approach, and scalability of the approach. Several prior art approaches are focussed on the purity and processing of the membrane by-product rather than the calcium carbonate by-product.

A number of approaches have been proposed where the separation is purely mechanical in nature, which inherently results in a relatively impure final calcium carbonate product with organic impurities. For example, U.S. Pat. No. 6,176,376 and U.S. Pat. No. 7,007,806 of MacNeil uses agitation in a liquid to create separation of the membrane and eggshell by relying on the differences in bulk density between the membrane and eggshell portions. The eggshell settles to the bottom of the tank while the membranes remain suspended in liquid. U.S. Pat. No. 6,649,203 of Thoroski describes an approach with centrifuging, washing, centrifuging, drying, and milling stages followed by a pneumatic membrane removal. In the pneumatic removal step, the membrane and eggshell fall through a suction flow which diverts the relatively light membrane but not the eggshell.

An approach that combines mechanical and chemical approaches may be seen in U.S. Publication No. 2006/0159816 and U.S. Pat. No. 7,954,733 of Vlad. This approach uses cavitation in a fluid tank (a mechanical step) to separate membrane from eggshell. Optionally, the membranes may be dried. Acetic acid may then be used to extract certain polypeptides from the membrane. However, this approach, and specifically the chemical extraction, is focused upon separation and treatment of the membrane materials, not the shells which are the source of calcium carbonate. In respect of the shells, they are again separated through a mechanical separation process only, and will have relatively high levels of organic impurities.

U.S. Pat. No. 7,597,280 of Floh describes a system wherein a slurry of finely ground shell and membrane is introduced into a separation tank with an upward flow and a number of overlapping vanes. The membrane is borne upwards and withdrawn by the vanes; the shell falls to the bottom of the tank and is removed. The membrane is dewatered (using protein dewatering) and dried. Again, the focus of this approach is on the production of the membrane as a product. In respect of the shells, they are separated through a mechanical separation process only, and will have relatively high levels of organic impurities. This approach is also quite costly.

SUMMARY

There is a need for a method of separating the membrane and calcium carbonate portions of eggshell by-products that produces calcium carbonate of a sufficiently high purity to meet USP and other quality standards and be used for human consumption in the food, pharmaceutical, nutraceutical and similar markets, but is also cost-effective, able to handle wide variations in the composition of the incoming eggshell by-product, can be scaled up as desired to accommodate an industrial volume of discharged eggshell by-product, and can be sold in commodity/bulk/ingredient form for inclusion in end-user/client products.

The method and apparatus disclosed herein for the separation and generation of high purity calcium carbonate from eggshell by-product can be broadly divided into mechanical and chemical stages that work together to break down the by-product into very pure forms of calcium carbonate via economically viable industrially-scalable methods.

In the mechanical stage, the by-product is first agitated (for example, through a mill apparatus) to create an initial mechanical separation of the membrane and shell in the by-product material in preparation for the sieving step. The second mechanical step is separation through sieving the by-product material to remove and recover relatively large pieces of membrane material. There are advantages to performing this step via a staged sieving process.

The sieved material will still have an undesirable (and in some markets, an unacceptable) amount of membrane attached to the calcium carbonate. The chemical phases involve digesting the material remaining from the sieve though digestion using base chemicals. These steps may be designed to work with a number of different bases, and with variations in the concentration of each base solution, the residence time involved in each digestion phase, the temperature of each base solution, and other variables associated with the processing of the material, number of digestion steps, and the processing parameters. The inventors have investigated these possibilities and have found that a process with a sodium hydroxide digestion followed by a sodium hypochlorite digestion (followed by a water wash) results in a calcium carbonate product of greater than 98% purity that will satisfy USP requirements for use for human consumption, as well as a number of end-use markets.

After the calcium carbonate is washed in water to remove remaining surface sodium hypochlorite and related salts, the purified calcium carbonate is typically dried. The purified calcium carbonate may then be milled or refined to any necessary particle size or subjected to other further processing as desired in the various marketplaces.

In accordance with the present invention, there is provided a method for the separation of calcium eggshell from an eggshell by-product comprising the steps of:
a. Agitating the eggshell by-product;
b. Sieving the eggshell by-product;
c. Subjecting the eggshell by-product to a functional digestion with a first base solution;
d. Subjecting the eggshell by-product to a refining digestion with a second base solution; and
e. Running the eggshell by-product through a washing stage using water.

In another aspect, the method further comprises the step:
f. Drying the eggshell by-product.

In another aspect of the present invention, the first base solution is one or more bases selected from the set of sodium hydroxide, ammonium hydroxide, potassium hydroxide, or an organic base, mixed with water. In another aspect of the present invention, the first base solution is primarily sodium hydroxide mixed with water. In another aspect of the present invention, the second base solution is primarily sodium hypochlorite mixed with water. In another aspect, the step of subjecting the eggshell by-product to a functional digestion with a first base solution comprises digestion with between 15-45% solids loading, a temperature between 30 to 90 degrees Celsius, and 0.5 to 5% NaOH in $H_2O$, with fluidization and a residence time between 15 min to 60 min. In another aspect, the step of subjecting the eggshell by-product to a functional digestion with a first base solution comprises digestion with 15% solids loading by volume, a temperature of 60 degrees Celsius, a 2.5% sodium hydroxide (NaOH) solution mixed in water (by weight), with fluidization, and a residence time of 30 minutes. In another aspect, the step of subjecting the eggshell by-product to a refining digestion with a second base solution comprises a solids loading between 15-45% solids by volume, ambient temperature, 6%-12% sodium hypochlorite (NaClO) mixed in water (by weight) with trace elements (less than 1%) of sodium hydroxide (alkaline solution), with fluidization and a residence time of between 10 and 40 minutes. In another aspect, the step of subjecting the eggshell by-product to a refining digestion with a second base solution comprises a 30% solids loading (by volume), with an 8% NaClO solution (mixed in water by weight), at ambient temperature, with fluidization, with a residence time of between 10 to 15 minutes.

In accordance with the present invention, there is provided a method for the separation of calcium eggshell from an eggshell by-product comprising the steps of: a) agitating the eggshell by-product using a ball mill for between 5 and 40 minutes; b) sieving the eggshell by-product with a sieve with a mesh size between ⅛ of an inch and ¼ of an inch; c) subjecting the eggshell by-product to a functional digestion with a NaOH solution comprising digestion with between 15-45% solids loading, a temperature between 30 to 90 degrees Celsius, and 0.5 to 5% NaOH in $H_2O$, with fluidization, and a residence time between 15 min to 60 min; d) subjecting the eggshell by-product to a refining digestion with a NaClO solution comprising digestion with a solids loading between 15-45% solids by volume, ambient temperature, 6%-10% sodium hypochlorite (NaClO) mixed in water (by weight) with trace elements (less than 1%) of sodium hydroxide (alkaline solution), with fluidization, and a residence time of between 10 and 40 minutes; and e) running the eggshell by-product through a washing stage using water.

In accord with the present invention, there is provided a system for the separation of calcium eggshell from an eggshell by-product comprising: an agitator, a sieving device, a functional digester using a first base solution, a refining digester using a second base solution, and a water rinse; wherein said apparatus is configured so that the eggshell by-product passes into the agitator, from the agitator to the sieving device, from the sieving device to the functional digester, from the functional digester to the refining digester, and from the functional digester to the water rinse.

In an aspect of the present invention, the first base solution is one or more bases selected from the set of sodium hydroxide, ammonium hydroxide, potassium hydroxide, or an organic base, mixed with water. In another aspect, the first base solution is primarily sodium hydroxide mixed with water. In another aspect, the second base solution is primarily sodium hypochlorite mixed with water. In another aspect, the functional digester is configured for digestion with between 15-45% solids loading, a temperature between 30 to 90 degrees Celsius, and 0.5 to 5% NaOH in $H_2O$, with fluidization and a residence time between 15 minutes to 60 minutes. In another aspect, the functional digester is configured for digestion with 15% solids loading by volume, a temperature of 60 degrees Celsius, a 2.5% sodium hydroxide (NaOH) solution mixed in water (by weight), with fluidization, and a residence time of 30 minutes. In another aspect, the refining digester is configured for digestion with a solids loading between 15-45% solids by volume, ambient temperature, 6%-12% sodium hypochlorite (NaClO) mixed in water (by weight) with trace elements (less than 1%) of sodium hydroxide (alkaline solution), with fluidization and a residence time of between 10 and 40 minutes. In another aspect, the refining digester is configured for digestion with a 30% solids loading (by volume), with an 8% NaClO solution (mixed in water by weight), at ambient temperature, with fluidization, for a residence time of between 10 and 15 minutes.

In accord with the present invention, there is provided calcium carbonate obtained from eggshell by-product with a purity of greater than 98%. In accord with the present invention, there is provided calcium carbonate obtained from eggshell by-product with a purity of greater than 99%. In accord with the present invention, there is provided calcium carbonate obtained from eggshell by-product with a purity of greater than 99.5%.

In accord with the present invention, there is provided a product prepared by the inventive process, where the product comprises calcium carbonate and less than 2% impurities (excluding water). In accord with the present invention, there is provided a product prepared by the inventive process, where the product comprises calcium carbonate and less than 1% impurities (excluding water).

In accord with the present invention, there is provided a method for the separation of calcium eggshell from an eggshell by-product comprising the steps of: a) Subjecting the eggshell by-product to a functional digestion with a first base solution; b) subjecting the eggshell by-product to a refining digestion with a second base solution; and c) running the eggshell by-product through a washing stage using water. In another aspect, there is further provided the step of d) drying the eggshell by-product.

DETAILED DESCRIPTION

The process that is the subject of this patent works with a wide variety of liquid egg discharged by-product products. It can process both shell material that has or has not passed through a centrifuge, and material that has small amounts of liquid egg remaining. The method will also operate when there is little to no liquid egg remaining in the by-product feedstock.

Figure 1:
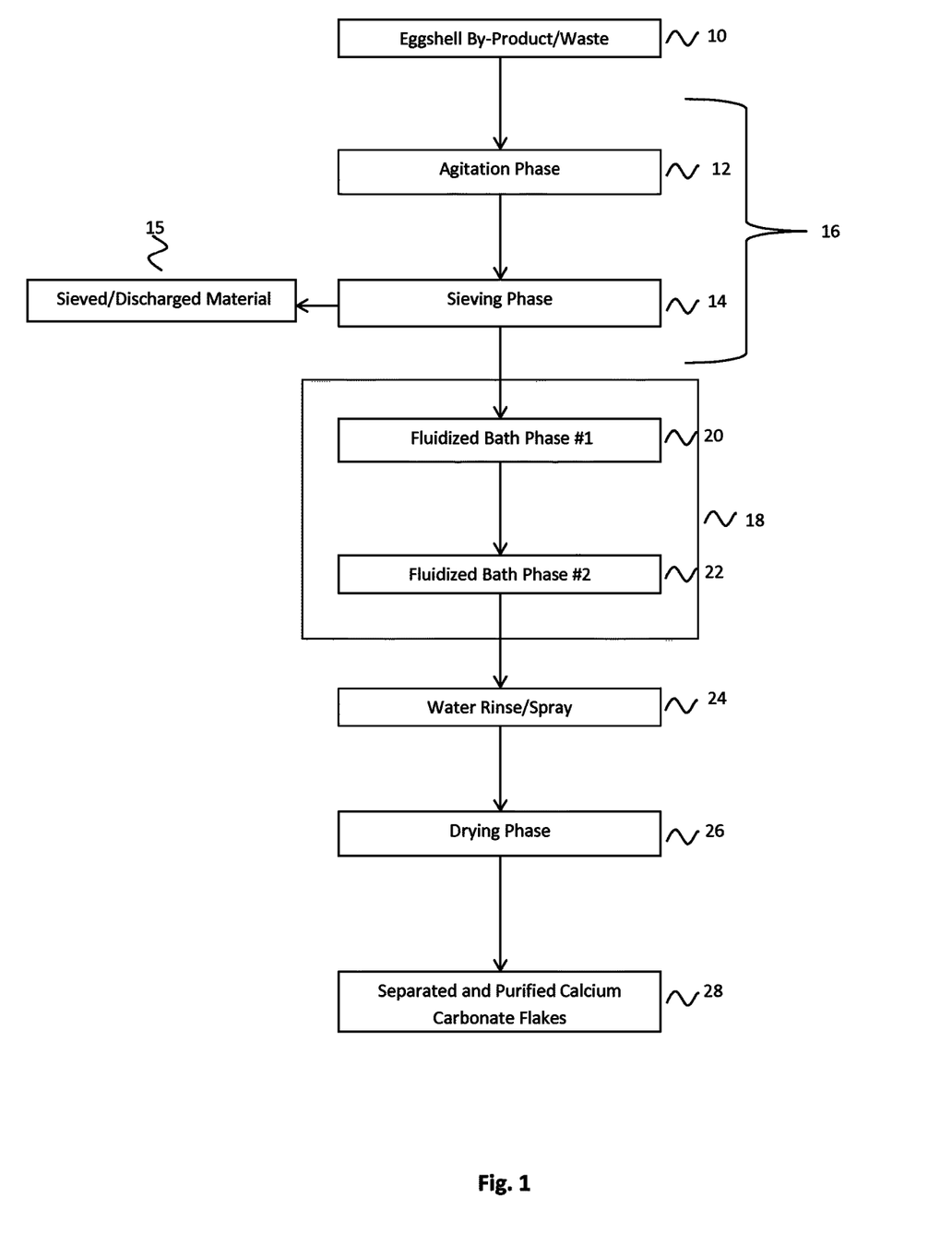
FIG. 1 is a schematic illustrating the steps of the process for separating eggshell from membrane.

Turning to FIG. 1, the first stage of this process begins with newly discarded eggshell by-product 10, which is waste to egg 'breaking' companies, containing shell and organic membrane. As a general matter, the shell may or may not be ground, and the organic membrane may or may not have been subject to some sort of separation process at the supplier (i.e. before it enters the present system). The present method can process by-product with wide variations without the need to recalibrate or vary the process.

In step 12, the by-product 10 is agitated to loosen the membrane from the shell aiding the effectiveness of the subsequent sieving step(s) via this initial mechanical separation of membrane and shell.

This agitation may be accomplished by numerous types of equipment. The agitation may be accomplished by milling the incoming by-product. In a preferred embodiment, the mill is a ball mill that produces material with a diameter of no greater than 5 mm. Testing shows that with such a ball mill, sufficient separation can be achieved by between 5 and 60 minutes of milling. In a preferred embodiment, the separation is achieved by milling for 20 minutes.

Although the primary goal of stage 12 is agitation and the resulting separation of the membrane and shell, some size reduction of the shell will take place as a by-product of this stage. This reduction can assist in the efficient sieving in the next step 14.

In step 14, the discharged material from step 12 is sieved to separate larger pieces of organic membrane from smaller pieces of membrane and shell. Generally, as more organic membrane is removed at this stage, the subsequent digestion stage can become more efficient, proficient and cost-effective.

Generally, the sieving is best done through one or more screens or sieves. Flowing water may be added to aid in the screening/sieving of preliminarily separated membrane material and shell.

In a preferred embodiment, the sieving will use one or more mesh screens with each having a mesh size of ⅛ of an inch to ¼ of an inch, with flowing water. In another preferred embodiment, the sieves are tiered with decreasing mesh sizes, culminating in a sieve with a mesh size of ⅛ of an inch to ¼ of an inch.

The discharge of membrane and shell that has successfully passed through the sieving step will then pass on to the chemical phase of the process, step 18. The membrane material that is removed by the sieving and is discharged from this process, indicated by 15 in FIG. 1, will account for approximately 3%-7% of the by-product 10, by weight. This membrane material 15 can be dried, preserved and further processed into a value-added saleable product.

Steps 12 and 14 comprise the mechanical portion of the process, indicated by 16 on FIG. 1.

In step 18, the sieved material is put through a digestion process comprised of at least two digestion steps using base solutions to remove remaining organic membrane and other impurities from the calcium carbonate (or shell). Many variations of which bases to employ, how many digestion steps to use, and the processing conditions are possible. The processing conditions include the solids content (as a percent of volume), the temperature of the base solution, the concentration of the base solution, the residence time, and the presence of agitation or fluidization.

A preferred embodiment has a functional digestion step 20, intended to remove the bulk of organic membrane (left after the sieving step 14) from the shells, and a refining digestion step 22, which is intended to remove the remaining traces of organic membrane as well as any other (non-membrane) organic impurities. The functional digestion step 20 could be performed with sodium hydroxide, ammonium hydroxide, potassium hydroxide, or an organic base. The functional digestion step could also be performed with a combination of bases. In a preferred embodiment, the functional digestion step 20 uses sodium hydroxide and the refining digestion step 22 uses sodium hypochlorite.

In a preferred embodiment of step 20, after being screened through the screener/sifter in step 14, the remaining sieved pieces of shell and membrane will be conveyed via mechanical and/or pneumatic conveyance to a steel tank fitted with an agitation apparatus containing a solution between 0.5 and 5% sodium hydroxide (NaOH) mixed in water, by weight. In a preferred embodiment, the solution is 2.5% sodium hydroxide (NaOH) mixed in water, by weight. The sodium hydroxide solution should be slightly warmer than ambient room temperature, and testing shows that the process works well at between 30 and 90 degrees Celsius. In a preferred embodiment, the temperature of the NaOH solution is 60 degrees Celsius.

The amount of solids loading (solids to liquid ratio) in step 20 will vary depending on desired operation time and volume required, but tests have shown that it should remain within a basic range of 15%-60% solids loading by volume. The desirable and effective residence time in the solution will also depend on application needs, and the temperature of the solution.

Tests have shown that an NaOH digestion step with between 15-45% solids loading, a temperature between 30 to 90 degrees Celsius, and 0.5 to 5% NaOH in $H_2O$ and a residence time between 15 min to 60 min will work. In a particularly preferred embodiment, tests have shown that at 15% solids loading by volume and a temperature of 60 degrees Celsius and a 2.5% sodium hydroxide (NaOH) solution mixed in water (by weight), a residence time of 30 minutes will be effective for this stage of separation.

All remaining eggshell material at the end of functional digestion step 20 will be discharged and conveyed to the refining digestion step 22.

In a preferred embodiment of refining digestion step 22, the remaining shell product will be conveyed via mechanical and/or pneumatic conveyance to a steel tank fitted with an agitation apparatus containing a base solution. In a preferred embodiment, the solution is a sodium hypochlorite solution. The sodium hypochlorite solution will work to remove any remaining membrane via digestion, as well as any other (non-membrane) organic impurities. Residence time and solids loading by weight can vary, however tests have shown that a high level of purity can be achieved with a solids loading between 15-45% solids by volume, ambient temperature, 6%-12% sodium hypochlorite (NaClO) mixed in water (by weight) with trace elements (less than 1%) of sodium hydroxide (alkaline solution) and an residence time of between 10 and 40 minutes.

In a particularly preferred embodiment (based on tests), step 22 has a 30% solids loading (by volume), with an 8% NaClO solution (mixed in water by weight), at ambient temperature, with fluidization/agitation, for a residence time of 10-15 minutes.

It is also possible for the solution in the refining digestion step to contain a mixture of bases, including mixtures of sodium hypochlorite with sodium hydroxide, ammonium hydroxide, potassium hydroxide, or an organic base.

The sodium hydroxide and sodium hypochlorite digestion stages 20 and 22 discussed above, working in tandem as a functional digestion followed by a refining digestion, act to achieve a high level of calcium carbonate purity via the digestion of organic membrane and purification of the shell. However, these stages 20 and 22 may be used independently of one another, and can each achieve a high level of purity in isolation, albeit lower than the purity achieved by the two steps together.

A re-circulation and/or drainage system may be built-in to the system used in steps 20 and 22 (or more broadly step 18) to accommodate the drainage and refilling of the digestion solutions upon the liquid becoming saturated and/or diluted from excessive batch use.

After digestion in step 18, the remaining shell material will be conveyed via mechanical and/or pneumatic conveyance to a water rinsing stage 24 where it will pass through a water bath or spray to remove any remaining surface sodium hypochlorite or related salts (sodium chloride) (and surface NaOH, if any) from the shell.

At this stage, a high purity calcium carbonate has been achieved, albeit in the presence of water (for many purposes, the water will need to be removed as seen in the next stage).

From the water-rinsing phase, the material will typically be passed through a drying device in step 26 to remove any excess moisture. Equipment that could be used in this stage includes a range of different drying technologies. In a preferred embodiment, a rotary dryer is used. In a preferred embodiment, the dryer operates within a temperature range of 50 Degrees to 350 Degrees. It is important to not perform the drying stage in such a way as to calcine the calcium carbonate; generally, the temperature should be kept below 800 degrees Celsius.

The method described herein can produce a calcium carbonate product 28 in flake form with a purity between 99% and 100% calcium carbonate. The shell product can be packaged as is into various forms of sanitary packaging, or further passed through a mill capable of fine grinding to wide-ranging particle size distributions, followed by finished goods packaging, depending upon the target market(s) and/or application(s).

An analysis of a representative final product from this process is given in Table 1. In some specific experimental runs, this method has resulted in calcium carbonate purity (measured using thermographic metric analysis) of 100%, with all impurities being below detectable limits.

In principle, the functional and refining digestion stages 20 and 22 can be used without the initial agitation and/or sieving steps to achieve a high purity calcium carbonate product. However, this approach would be more costly than an approach that incorporates the agitation and sieving steps, since the agitation and sieving steps will remove membrane that otherwise would need to be removed through more aggressive and costly digestion.

TABLE 1

Chemical Composition Breakdown - Calcium Carbonate

| Test Method | Compound Symbol | Compound Name | Results |
|---|---|---|---|
| Thermographic Metric Analysis (TGA) | CaCO3 | Calcium Carbonate | 98.3% |
|  | MgCO3 | Magnesium Carbonate | 0.23% |
| Infrared Spectroscopy | TOC | Total Organic Carbon | 0.0052% |
| XRF & ICP | LOI @1000 C. | Loss on Ignition (Weight) | 43.99% |
| X-Ray Fluorescence | CaO | Calcium Oxide | 54.4% |
| Inductively Coupled Plasma | MgO | Magnesium Oxide | 0.49% |
|  | SiO2 | Silicon Dioxide (Silica) | 0.33% |
|  | Al2O3 | Aluminum Oxide | <0.1% |
|  | Fe2O3 | Iron Oxide | <0.01% |
|  | Na2O | Sodium Oxide | 0.01% |
|  | K2O | Potassium Oxide | <0.01% |
|  | TiO2 | Titanium Dioxide | <0.01% |
|  | MnO | Manganese | <0.001% |
|  | SrO | Strontium Oxide (Strontia) | 0.019% |
|  | P2O5 | Phosphorous Pentoxide | 0.31% |
|  | S | Sulfur | 0.021% |
| Instrumental Neutron Activation Analysis | Cl | Chlorine | NMT 0.01% |
| AMS | Fe | Iron | <0.001% |
| Accelerator Mass Spectrometry | As | Arsenic | 1.9 ppm |
|  | Ba | Barium | 10.7 ppm |
|  | Cd | Cadmium | 0.02 ppm |
|  | Cr | Chromium | <1 ppm |
|  | Pb | Lead | 0.07 ppm |
|  | F | Fluorine | Not Detected |
| Cold Vapor | Hg | Mercury | Not Detected |

TABLE 1-continued

Chemical Composition Breakdown - Calcium Carbonate

| Test Method | Compound Symbol | Compound Name | Results |
|---|---|---|---|
| Hunter Brightness | | | |
| L Scale | | | 94.3 |
| a Scale | | | 0.02 |
| b Scale | | | 3.73 |

Optionally, after the sieving stage but before the digestion stage, further membrane may be removed from the feedstock by burning. There are several devices known to persons skilled in the art that could be used for this step, including flash dryers. However, this step is disfavored, since such burning is necessarily an expensive process, and tends to produce a calcium carbonate product that is greyish in colour and thus unacceptable in many markets. It is also unnecessary, since a high purity calcium carbonate product can be achieved using the method described above without this step. If this step was to be used, care needs to be taken to avoid calcining the calcium carbonate, which occurs at temperatures approaching 800 degrees Celsius, and also occurs at a slower rate at lower temperatures.

Figure 2:
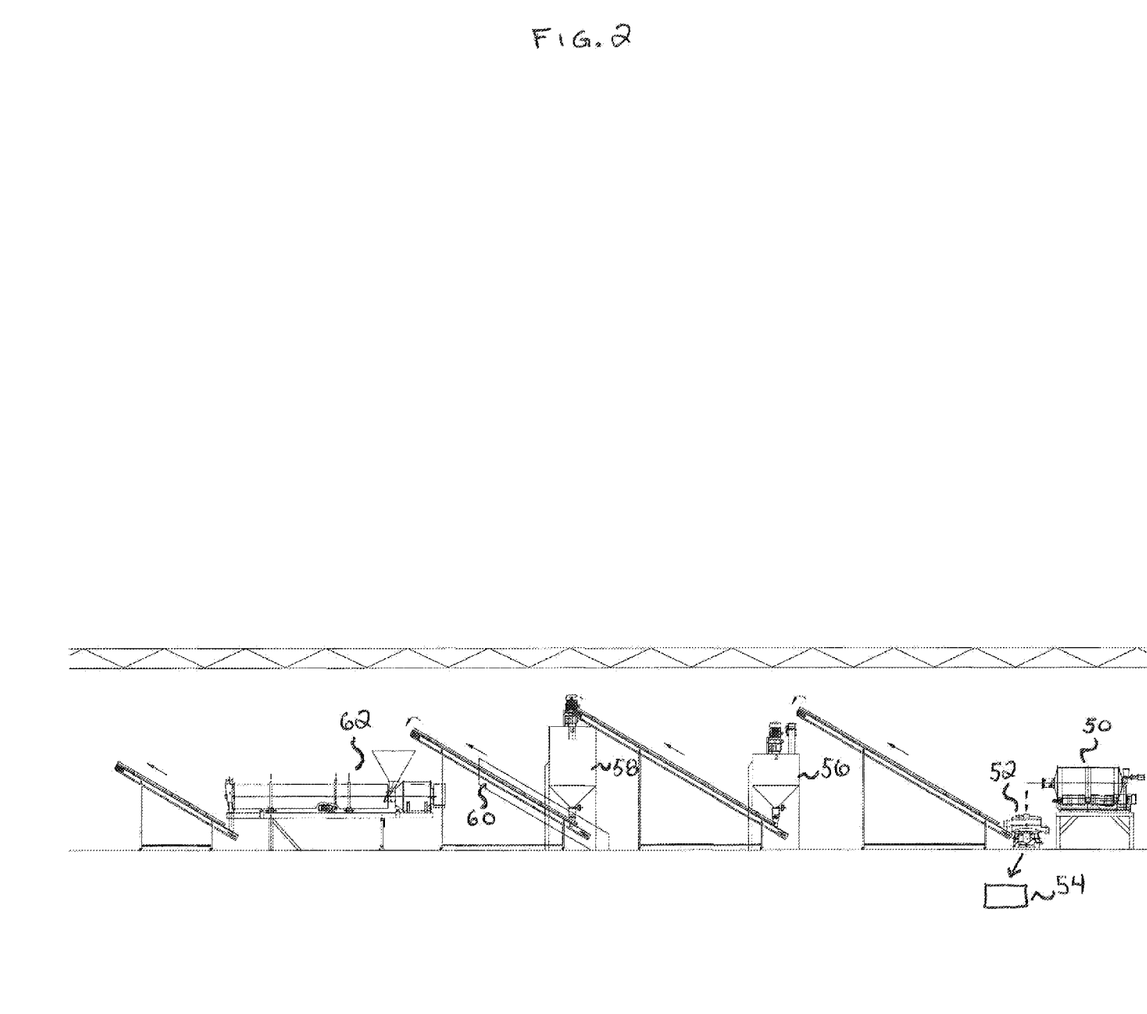
FIG. 2 is an elevation view of one embodiment of a system to implement the process.
Figure 3:
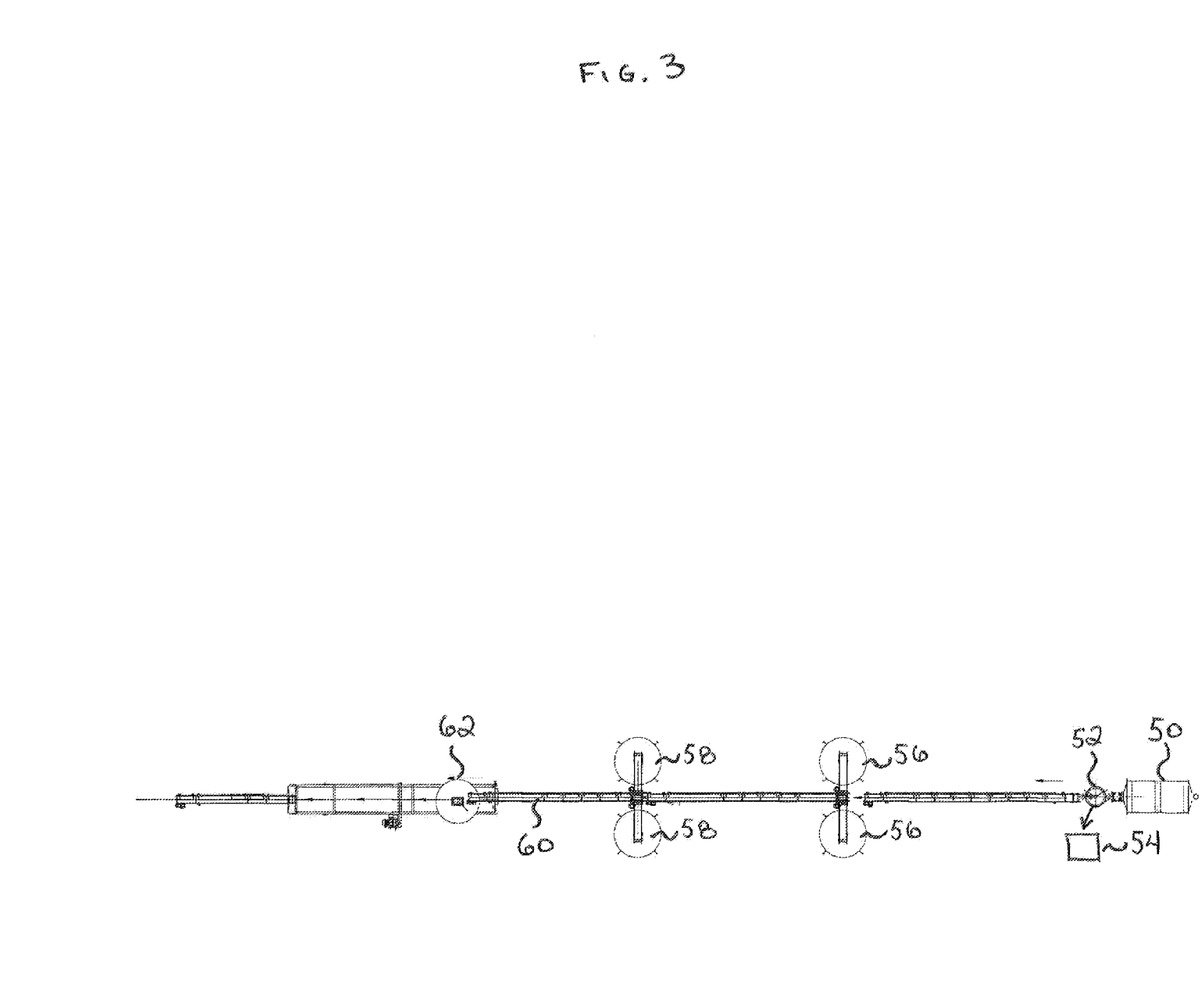
FIG. 3 is an aerial view of the embodiment illustrated in FIG. 2.

FIGS. 2 and 3 illustrate a system implementation of the invention. Turning to FIG. 2, the newly discarded eggshell by-product, containing inorganic shell and organic membrane, is introduced into an agitator 50. Numerous types of equipment known to those skilled in the art may be used as an agitator 50. One type of equipment that may be used is a milling machine. In a preferred embodiment, the agitator 50 is a ball mill that produces material with a diameter of no greater than 5 mm. Testing shows that with such a ball mill, sufficient separation can be achieved after between 5 and 60 minutes. In a preferred embodiment, the separation is achieved by agitating for 20 minutes.

The discharged material from agitator 50 is passed to a sieving device 52. Optionally (and not illustrated), the discharged material may rest in a holding tank before being passed to a sieving device 52. In a preferred embodiment, the sieving device has a single sieve with a mesh size of ⅛ of an inch to ¼ of an inch, optionally with flowing water to assist in moving the material. In another preferred embodiment, the sieving will use a multi-layer mesh screen with multiple sieves each having a mesh size of ⅛ of an inch to ¼ of an inch, optionally with flowing water to assist in moving the material. In another preferred embodiment, the sieves are tiered with decreasing mesh sizes, culminating in a sieve with a mesh size of ⅛ of an inch to ¼ of an inch, optionally with flowing water.

The organic membrane material that is removed by sieving device 52 is discharged into device 54. Device 54 may be any desirable device for the further processing, holding, or disposal of the organic membrane material that is removed by sieving device 52.

The shell and remaining organic membrane that has passed through sieving machine 52 is passed to a functional digester 56 which uses a base mixed with water. Optionally (and not illustrated), the discharged material may rest in a holding tank before being passed to the functional digester 56. In a preferred embodiment, the shell and remaining organic membrane that has passed through sieving machine 52 are conveyed via mechanical and/or pneumatic conveyance to functional digester 56. In a preferred embodiment, functional digester 56 is a steel tank fitted with an agitation apparatus containing a solution of sodium hydroxide (NaOH) mixed in water. In other embodiments, the solution may be ammonium hydroxide mixed in water, potassium hydroxide mixed in water, an organic base mixed in water, or a mixture of these possible bases (sodium hydroxide, ammonium hydroxide, potassium hydroxide, an organic base) mixed in water.

In a preferred embodiment, the functional digester 56 is implemented with a solids loading of between 15-45% (by volume), a temperature between 30 to 90 degrees Celsius, a 0.5 to 5.0% NaOH mixed in water solution (by weight) and a residence time between 15 minutes to 60 minutes. In a particularly preferred embodiment, the functional digester 56 is implemented at 15% solids loading by volume and a temperature of 60 degrees Celsius and a 2.5% sodium hydroxide (NaOH) solution mixed in water (by weight) and a residence time of 30 minutes.

All shell and remaining membrane material after processing through functional digester 56 is then conveyed to refining digester 58 which uses a second base (not the same as the base used in the functional digester) mixed with water. Optionally (and not illustrated), the discharged material may rest in a holding tank before being passed to the refining digester 58. In a preferred embodiment, the shell and remaining organic membrane that has passed through functional digester 56 is conveyed via mechanical and/or pneumatic conveyance to refining digester 58. In a preferred embodiment, refining digester 58 is a steel tank fitted with an agitation apparatus containing a solution of sodium hypochlorite (NaClO) mixed in water.

In a preferred solution, the refining digester 58 is configured so the incoming material has a residence time of between 10 and 40 minutes, solids loading between 15-45% solids by volume, ambient temperature, and a 6%-12% sodium hypochlorite (NaClO) mixed in water (by weight) with trace elements (less than 1%) of sodium hydroxide (alkaline solution).

In a particularly preferred embodiment, refining digester 58 is configured to operate at a 30% solids loading (by volume), with an 8% NaClO solution (mixed in water by weight), at ambient temperature, with fluidization, for a residence time of 10-15 minutes.

In another embodiment, the solution used in refining digester 58 is sodium hypochlorite plus one or more additional bases mixed with water. The additional bases may include sodium hydroxide, ammonia hydroxide, potassium hydroxide, or organic bases.

A re-circulation and/or drainage system (not illustrated) may be built-in to digesters 56 and 58 to accommodate the drainage and refilling of the digestion solutions upon the liquid becoming saturated and/or diluted from excessive use.

After digestion in the refining digester 58, the remaining shell material will be conveyed to a water rinse 60. Optionally (and not illustrated), the shell material may rest in a holding tank before being passed to the water rinse 60. The water rinse may be any water bath or spray known in the art that will remove any remaining surface sodium hypochlorite or related salts (sodium chloride) (and surface NaOH, if any) from the shell. In a preferred embodiment, the shells pass via mechanical and/or pneumatic conveyance through water rinse 60.

At this stage, a high purity calcium carbonate has been achieved, albeit in the presence of water (for many purposes, the water will need to be removed as seen in the next stage).

From water rinse 60, the shell material is passed through a drying device 62 to remove any excess moisture. Optionally (and not illustrated), the shell material may rest in a holding tank before being passed to the drying device 62. Many types of drying equipment are known to a person skilled in the art and could be used as drying device 62. In a preferred embodiment, drying device 62 is a rotary dryer. In a preferred embodiment, the drying device 62 operates within a temperature range between 50 degrees to 350 degrees Celsius. It is important to not perform the drying stage at a temperature that would calcine the calcium carbonate; generally, the temperature should be kept well below 800 degrees Celsius.

The system and apparatus described above can produce a calcium carbonate product in flake form with a purity between 98% and 100% calcium carbonate.

The calcium carbonate can then be subject to further processing as desired for the end-market. The calcium carbonate product can be packaged as is into various forms of sanitary packaging, or further passed through a mill capable of super-fine grinding to a smaller/finer particle sizes, followed by finished goods packaging, depending upon the target market and/or application.

Although the foregoing description and accompanying drawings relate to specific preferred embodiments of the present invention as presently contemplated by the inventor, it will be understood that various changes, modifications and adaptations may be made without departing from the spirit of the invention.

What is claimed is:

1. A method for the separation of calcium carbonate from an eggshell by-product comprising the steps of:
    a. Agitating the eggshell by-product;
    b. Sieving the eggshell by-product resulting from step a;
    c. Subjecting the eggshell by-product resulting from step b to a functional digestion with a first base solution at a temperature of at least 30 degrees Celsius and a residence time of at least 15 minutes, wherein the first base solution is primarily sodium hydroxide mixed with water;
    d. Subjecting the eggshell by-product resulting from step c to a refining digestion with a second base solution; wherein the refining digestion with a second base solution comprises a solids loading between 15-45% solids by volume, ambient temperature, 6%-12% sodium hypochlorite mixed in water by weight with less than 1% sodium hydroxide, with fluidization and a residence time of between 10 and 40 minutes; and
    e. Running the eggshell by-product resulting from step d through a washing stage using water to obtain calcium carbonate.

2. The method of claim 1 where the step of subjecting the eggshell by-product to the functional digestion comprises digestion with between 15-45% solids loading, a temperature between 30 to 90 degrees Celsius, and 0.5 to 5% sodium hydroxide solution mixed in water by weight, with fluidization and a residence time between 15 min to 60 min.

3. The method of claim 1 where the step of subjecting the eggshell by-product to the functional digestion comprises digestion with 15% solids loading by volume, a temperature of 60 degrees Celsius, a 2.5% sodium hydroxide solution mixed in water by weight, with fluidization, and a residence time of 30 minutes.

4. The method of claim 1 where the step of subjecting the eggshell by-product to the refining digestion comprises a 30% solids loading by volume, with an 8% sodium hypochlorite solution mixed in water by weight, at ambient temperature, with fluidization, with a residence time of between 10 to 15 minutes.

5. The method of claim 1 wherein the obtained calcium carbonate has a purity of greater than 98%.

6. The method of claim 1 wherein the obtained calcium carbonate has less than 2% impurities excluding water.

7. A method for the separation of calcium carbonate from an eggshell by-product comprising the steps of:
    a. Agitating the eggshell by-product using a ball mill for between 5 and 40 minutes;
    b. Sieving the eggshell by-product with a sieve with a mesh size between ⅛ of an inch and ¼ of an inch;
    c. Subjecting the eggshell by-product to a functional digestion with a NaOH solution comprising digestion with between 15-45% solids loading, a temperature between 30 to 90 degrees Celsius, and 0.5 to 5% NaOH in water, with fluidization, and a residence time between 15 min to 60 min.
    d. Subjecting the eggshell by-product to a refining digestion with a NaClO solution comprising digestion with a solids loading between 15-45% solids by volume, ambient temperature, 6%-10% NaClO mixed in water by weight with less than 1% NaOH, with fluidization, and a residence time of between 10 and 40 minutes; and
    e. Running the eggshell by-product through a washing stage using water to obtain calcium carbonate.

8. The method of claim 7 wherein the obtained calcium carbonate has a purity of greater than 98%.

9. The method of claim 7 wherein the obtained calcium carbonate has less than 2% impurities excluding water.

* * * * *